United States Patent [19]

Camras

[11] 4,425,589
[45] Jan. 10, 1984

[54] RECORD MEDIUM TRANSDUCING ERROR CORRECTION SYSTEM AND METHOD

[75] Inventor: Marvin Camras, Glencoe, Ill.

[73] Assignee: IIT Research Institute, Chicago, Ill.

[21] Appl. No.: 256,733

[22] Filed: Apr. 23, 1981

[51] Int. Cl.³ .............................. G11B 5/09; G11B 5/02
[52] U.S. Cl. .......................................... 360/51; 360/27
[58] Field of Search ........................ 360/27, 28, 51, 39

[56] References Cited

U.S. PATENT DOCUMENTS

| | | | |
|---|---|---|---|
| 3,141,926 | 7/1964 | Newell | 360/27 |
| 3,500,362 | 3/1970 | Schmitz et al. | 360/27 |
| 3,548,112 | 12/1970 | Pearson | 360/28 |
| 3,789,379 | 1/1974 | Breikss | 360/27 |
| 3,810,235 | 5/1974 | Hopkins et al. | 360/51 |
| 3,982,277 | 9/1976 | Naylor | 360/27 |
| 4,054,921 | 10/1977 | Tatami | 360/27 |
| 4,318,137 | 3/1982 | Cordova et al. | 360/32 |

Primary Examiner—Vincent P. Canney
Attorney, Agent, or Firm—Hill, Van Santen, Steadman & Simpson

[57] ABSTRACT

In one exemplary embodiment errors due to tape flutter are overcome by recording along with the analog signal clock pulses having a rate sufficient for sampling of the highest frequency component of the analog signal. Then on playback, the reproduced clock pulses control sampling and storage of samples of the reproduced analog signal. By reading out the samples from storage at a uniform clock rate, the effect of flutter on the reproduced signal is eliminated. In another example the recorded clock rate overcomes tape skew and other mechanical irregularities in recording and reproducing multiplexed analog or digital data.

1 Claim, 13 Drawing Figures

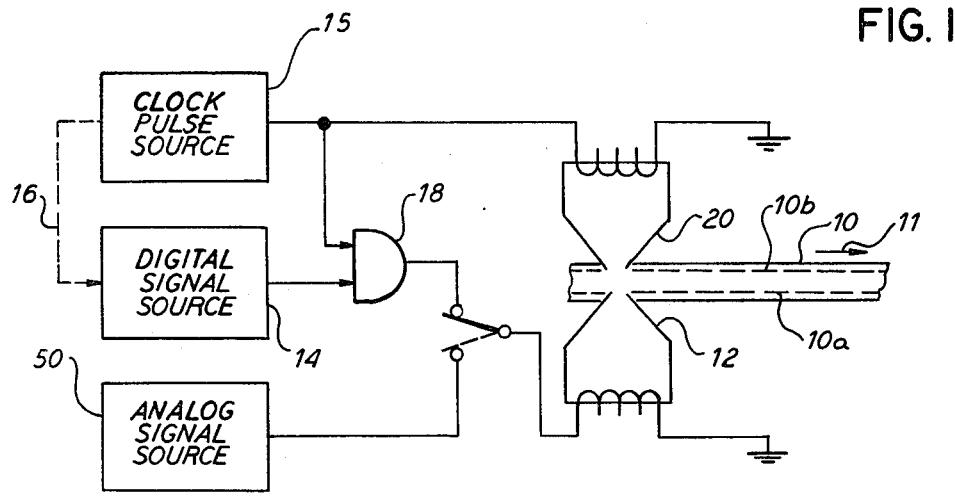
FIG. 1
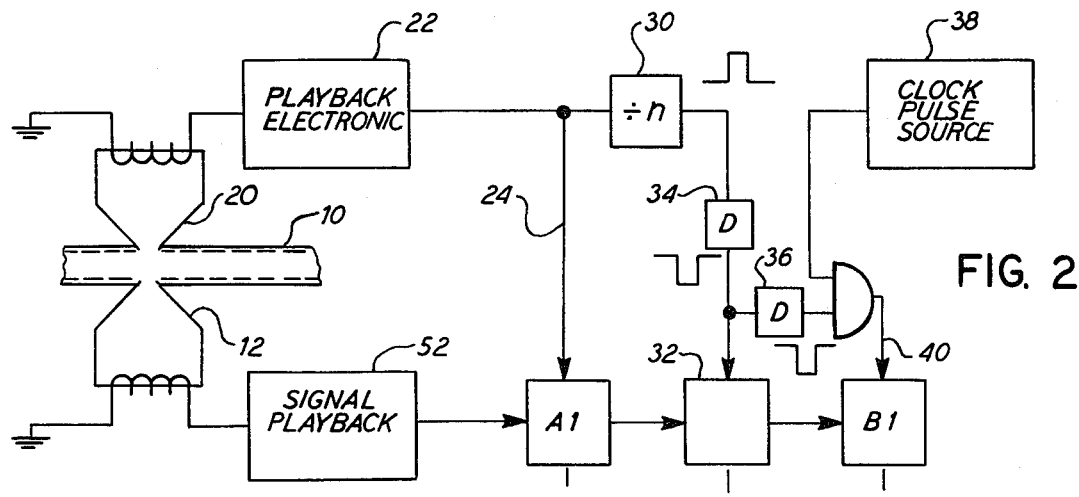
FIG. 2

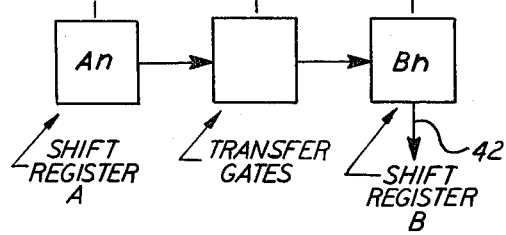

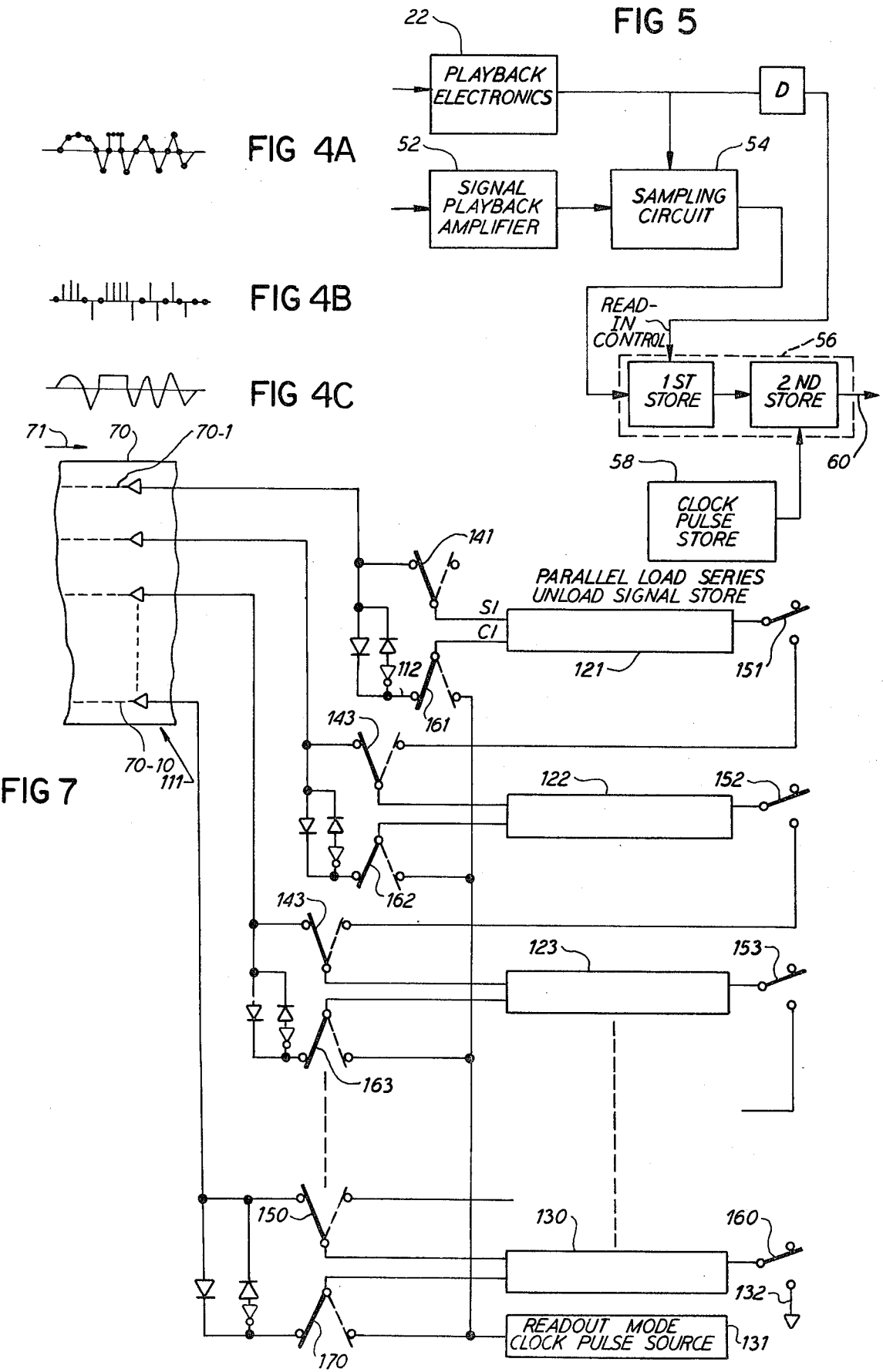

RECORD MEDIUM TRANSDUCING ERROR CORRECTION SYSTEM AND METHOD

SUMMARY OF THE INVENTION

The present invention is particularly concerned with the transducing of information signals with respect to a moving record medium wherein the characteristics of the record medium (for example a lengthy tape record medium) give rise to mechanical transducing variation which affects the time base accuracy of the reproduced information signal.

With respect to recording and reproducing on a single channel of a tape record medium, for example, flutter in the motion of the tape record medium during reproduction adversely affects the time base accuracy of the reproduced information signal.

In the case of a multichannel tape record medium, for example, mechanical distortions of the tape record medium in the vicinity of the transducer head during playback may also give rise to time base inaccuracy. For example, if the information signal has been recorded by multiplexing thereof over the respective parallel channels, possible mechanical distortion across the width of the record medium limits the density with which the information signal can be recorded on the respective channels.

It is therefore an object of the present invention to provide a relatively economical system and method for overcoming such mechanical transducing variations and thus ensuring the time base accuracy of the reproduced signals from the record medium. Thus, on the one hand, information signals may be reproduced with a time base accuracy greatly exceeding the steadiness of the record medium motion during the transducing operation. On the other hand, for a multichannel record medium, information may be recorded in a multiplexed fashion with greatly increased density, and with compensation for the dimensional instability of the record medium.

In accordance with the teachings of the invention, a clock pulse signal is recorded along with the information signal, the clock pulse signal having a substantially greater time base accuracy than the transducing accuracy of the record medium transducing system because of mechanical transducing variation. Then, during reproduction, the recorded clock pulses are reproduced and utilized to control the storage of the information signal with its original time base accuracy. By utilizing an accurate clock rate to read the stored signal, the original time base accuracy of the information signal is restored.

In the case of a multichannel transducing system, a sufficient number of channels are provided with recorded clock pulse reference signals so as to overcome time base inaccuracies resulting from the mechanical distortion of the record medium. As an example, where coded data is recorded, the coding itself may be such as to provide a bit rate signal having the time base accuracy of the recorded information signal.

In the case of an analog information signal being recorded along with a clock pulse signal, the reproduced clock pulses may be utilized to control sampling of the reproduced analog signal, the samples being shifted at the reproduced clock pulse rate into a charge transfer storage device, the stored samples subsequently being read out at a uniform clock rate to restore the original time base accuracy of the recorded analog signal.

BRIEF DESCRIPTION OF THE DRAWINGS

FIG. 1 is a diagrammatic illustration of a recording system in accordance with the present invention;

FIG. 2 is a diagrammatic illustration of a playback system for electrically reproducing signals recorded by the system of FIG. 1;

FIG. 5 is a diagrammatic illustration of a playback system for use in a flutter compensation system and method for analog signals such as represented in FIGS. 3 and 4;

FIG. 7 is a diagrammatic illustration of a playback arrangement for electrically reproducing the signals recorded by the system of FIG. 6.

DETAILED DESCRIPTION

Figure 3A:
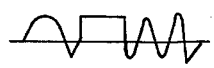
FIG. 3 (comprising FIGS. 3A through 3D) and FIG. 4 (comprising FIGS. 4A through 4D) show waveform diagrams for explaining a flutter compensation system and method in accordance with the present invention for analog signals.
Figure 3B:
Figure 3C:
Figure 3D:

FIGS. 1 and 2 illustrate a flutter correction system and method in accordance with the present invention as applied to a lengthy magnetic record tape 10. Many efforts have been made in the past to minimize the problem of flutter in magnetic tape transducer systems, and a particular example is found in my pending application Ser. No. 900,078 filed Apr. 26, 1978, entitled "Capstan Drive System for Tape Record Media", now U.S. Pat. No. 4,266,255 issued May 5, 1981, and the disclosure of this copending application is incorporated herein by reference as illustrating single channel and multichannel tape record medium transducing systems to which the present invention may be applied.

In FIG. 1, tape record medium 10 is shown as being driven in the direction of the arrow 11 by means of a suitable capstan drive (not shown) so as to move the record medium as nearly as possible at a constant speed. A magnetic transducer head is indicated at 12 for recording an information signal, for example from a digital information signal source 14. By way of example, the signal source 14 may supply a series of digital words, each word being represented by a time series of essentially uniformly spaced code positions where the presence of a pulse, for example, may represent a binary digit one, while the absence of a pulse at a given bit position may represent a binary zero. A clock pulse source is indicated at 15 which may be coupled as indicated by dash line 16 with the information signal source 14, so that the successive binary signals generated by the source 14 are essentially in synchronism with the clock pulses of clock pulse source 15. For the sake of diagrammatic indication, and AND gate 18 is indicated receiving the binary signals from source 14, and being gated by the precise pulses of the clock pulse source 15, so that the digital signals supplied to the transducer head 12 are precisely synchronized with the pulses of the clock pulse source 15. A second transducer head 20 is shown as being in scanning relation to a second channel of record medium 10 which is relatively closely adjacent to the information channel being scanned by transducer head 12. The proximity of the information channel 10a and the clock pulse channel 10b is such that any physical deformation of the tape 10 will not introduce significant errors in the transverse alignment of simultaneously recorded signals of the channels 10a and 10b. Thus, during reproduction, any flutter which is introduced in the reproduction of the channel 10a will essentially be accurately duplicated by corresponding flutter in the reproduction of the clock pulse channel 10b.

FIG. 2 illustrates a system for reproducing the information recorded as shown in FIG. 1. In this example, the digital signal pulses on channel 10a are produced by transducer head 12 and supplied to the input stage (designated A1) of a shift register A. By way of example, if there are a number n of bits per digital word recorded on channel 10a, then register A may have n stages A1 . . . $A_n$. As indicated, transducer head 20 may be coupled via suitable playback electronics 22 so as to supply reproduced clock pulses from channel 10b to the shift input 24 of shift register A. Thus, regardless of any flutter in the motion of the tape record medium 10, each recorded position of channel 10a will be accurately read into the shift register A and thereafter successively shifted through the successive stages of the shift register according to the timing of the reproduced clock signals of channel 10b. In this way, any flutter in the motion of the tape record medium 10 will not interfere with the accurate supply of the originally recorded signal to the respective stages of shift register A. More particularly, the shift register A can respond to the successive reproduced clock pulses accurately, in spite of time base errors in the intervals between the successive reproduced clock pulses due to flutter in the motion of the tape record medium 10.

For the sake of diagrammatic illustration, a divider circuit is indicated at 30 which may divide the input reproduced clock pulse rate by the number n so as to actuate a transfer gate circuit 32 as soon as the register A has been filled with a reproduced digital word. Accordingly, the reproduced digital word is transferred in parallel into register B within a time interval which is less than the interval between recorded digital words on the channel 10a. A delay element is indicated at 34 for diagrammatic purposes so as to ensure that the digital word has been properly entered into register A before its transfer into register B. As diagrammatically indicated by AND gate 36, the supply of shift pulses to register B from clock pulse generator 38 is momentarily interrupted if necessary at the time of transfer of the digital word into register B. As soon as the digital word is placed in register B, gate 36 is unblocked, and accurately timed clock pulses are supplied to the shift input 40 of register B from the clock pulse generator 38 so as to supply the reproduced digital word at output 42 of register B with the same accurate timing as the original digital signal, and with any flutter due to motion of the record medium 10 during reproduction removed from the reproduced digital signal at output 42. Thus, the time base accuracy of the reproduced digital signal at output 42 is in conformity with the time base accuracy of the clock pulse generator 38, and such accuracy may greatly exceed any possible accuracy which may be attained by means of a tape record transducing system such as shown in my prior application Ser. No. 900,078.

FIG. 3 illustrates the case where an analog signal from source 50, FIG. 1, is recorded on channel 10a. The analog waveform of FIG. 3A is recorded on channel 10a by transducer head 12, and a regular clock pulse signal as indicated in FIG. 3B is recorded by transducer head 20 on channel 10b. During playback, because of flutter in the motion of the record medium 10, both the reproduced analog waveform as shown in FIG. 3C and the reproduced clock signal as shown in FIG. 3D have time base errors. The time base erros of FIGS. 3C and 3D, however, are in exact synchronism because of the close proximity of channels 10a and 10b. By way of example as indicated in FIG. 5, the reproduced analog signal may be supplied via a playback amplifier 52 to a sampling circuit 54 which is controlled by the reproduced clock pulses of FIG. 3D to effect sampling of the reproduced waveform as illustrated in FIG. 4A. The successive samples as represented in FIG. 4B are then transferred to successive storage locations of a sample storage 56 under the control of the reproduced clock pulse rate of FIG. 3D. In one example, the sampling circuit 54 may convert the successive samples as represented in FIG. 4A into successive digital words, whereupon the sample storage 56 may take the form of a shift register receiving the successive digital words at the reproduced clock rate, but shifting the words at an intermediate stage toward the output stage at a fixed clock rate as determined by a clock pulse source 58, so that the digital words are supplied at the output 60 of the sample storage at a uniform rate and may be converted again to analog form as represented in FIG. 4B, but with a precisely uniform time base conforming with the time base of the original signal of FIG. 3A. A suitable low pass filter may then be utilized to restore the original waveform as illustrated in FIG. 4C.

As a second example also illustrated by the diagram of FIG. 5, the samples as represented in FIG. 4A may be supplied to the charge transfer device in analog form with a first section of the transfer device shifting the analog charge signal at the reproduced clock pulse rate. A second section of the charge transfer device may be operated at a uniform clock pulse rate by means of clock pulse source 58 so that the analog samples are supplied to output 60 as represented by FIG. 4B. Again, the samples of FIG 4B can be converted into the original waveform of FIG. 4C by means of a suitable low pass filter.

In each of the examples with respect to FIG. 5, the block 56 may represent first and second stores with parallel transfer therebetween as specifically illustrated in FIG. 2. With parallel transfer, greater degrees of record medium flutter or the like can be tolerated.

Figure 6:
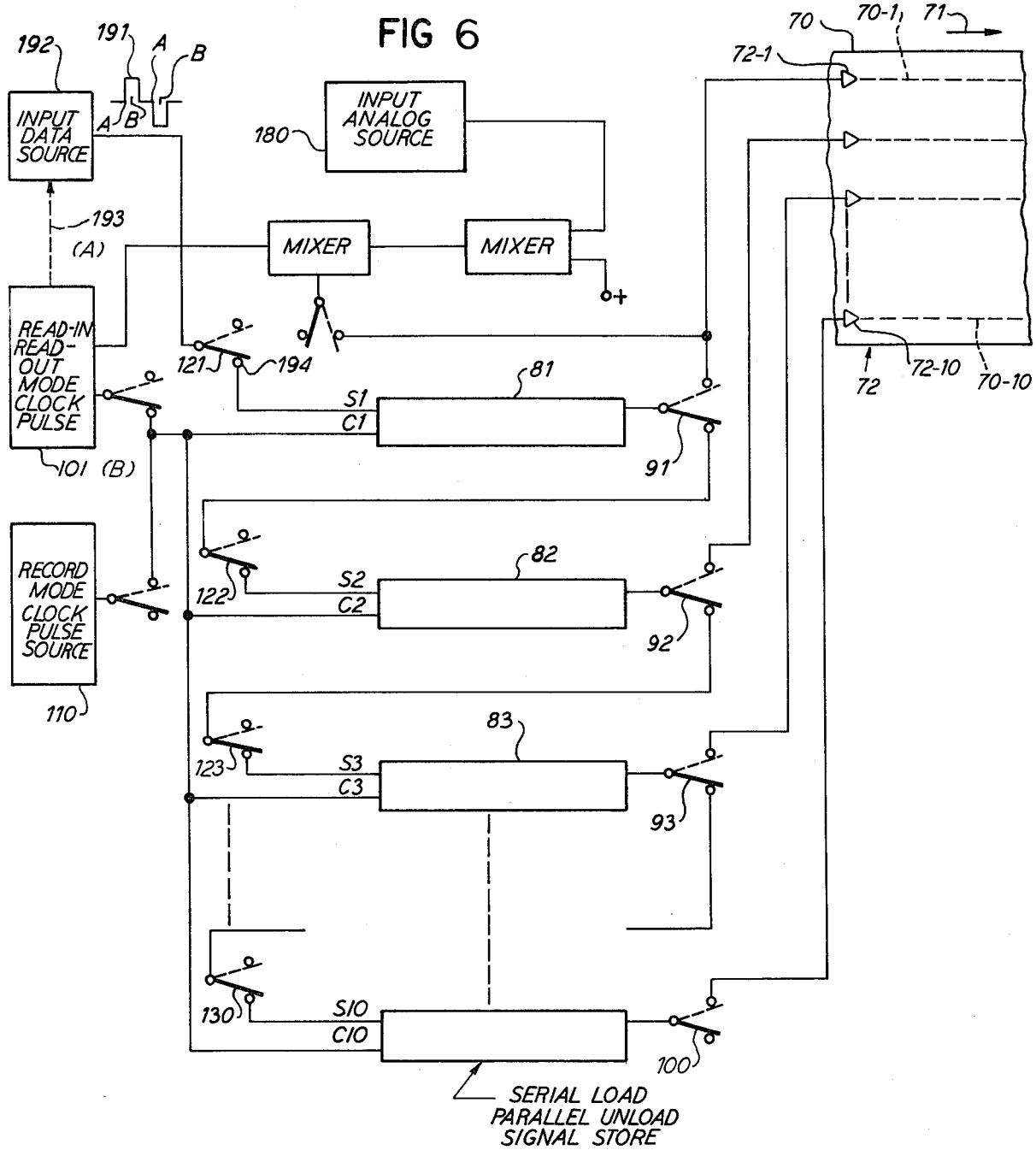
FIG. 6 is a diagrammatic illustration of a multichannel recording system for overcoming problems of mechanical variation in the record transducing apparatus, for example where a signal is multiplexed onto a series of record channels.

FIGS. 6 and 7 illustrate a multiplexing system wherein the recorded information may be recorded with greater density because of the recording of clock pulse signals in association with the respective channels.

FIG. 6 illustrates a relatively wide multichannel record medium 70 moving at relatively uniform speed in the direction of arrow 71 and having a series of transducer head units 72 cooperating with respective channels of the record medium. In the exemplary embodiment, there may be ten record channels for receiving coded digital data wherein for example positive recorded pulses represent a binary one value and negative recorded pulses represent a binary zero value. For the sake of diagrammatic illustration, it may be assumed that a sixty bit coded word has been loaded serially into shift registers such as 81, 82, 83, . . . 90. In loading a digital word into the shift registers, switches 91, 92, 93, . . . 100 are placed in their lower position so as to couple the output of shift register 81 with the input S2 of shift register 82, and so as to connect the output of shift register 82 with the input S3 of shift register 83, and so on. The shift control inputs C1, C2, C3, . . . C10 in this mode of operation receive a relatively high clock pulse rate from a clock pulse source 101 which is approximately ten times higher than the bit rate to be recorded on each channel of the record medium 70. The switches 91, 92, 93, . . . 100 are implemented as electronic switches so as to be able to effect switching operations in a relatively brief time.

During recording operation as illustrated in FIG. 6, the switches 91-100 are actuated to conditions corresponding to the positions of the switch arm indicated in dash outline in FIG. 6, and a relatively slow clock pulse rate is supplied from a clock pulse source 110 to the shift inputs C1 through C10 so as to progressively supply the stored signals to the respective transducer head units such as those specifically designated 72-1 and 72-10 in FIG. 6 for recording on respective channels such as those indicated specifically at 70-1 and 70-10 on the record medium 70. The clock pulse rate of clock pulse source 110 is effectively recorded on each of the channels since the occurrence of the positive and negative digital pulses on each channel is synchronized with the clock pulse rate of source 110 during the recording operation.

Referring to FIG. 7, during the playback operation, each reproduced pulse from a given channel may be transmitted to a corresponding clock pulse output line of the set of magnetic playback head units designated by reference numeral 111 in FIG. 7. Thus, the signals reproduced from channel 1 of the record medium 70 may give rise to a clock pulse output at 112, FIG. 7, which is supplied to the shift input C1 of a playback shift register 121 corresponding to shift register 81 of FIG. 6. The actual coded output pulses from channel No. 1 are supplied to a data input S1 of the shift register 121, so that the coded signal from channel 1, for example, is accurately supplied to the respective stages of the shift register 121 during the playback operation. Similarly, for the other channels, each channel is respectively input to a corresponding shift register such as 122, 123 . . . 130, FIG. 7, corresponding to one of the shift registers of FIG. 6, so that the playback operation results in the restoring of the signal distribution to the respective shift registers corresponding to shift registers 81 through 90 of FIG. 6. Since the loading of each playback shift register is controlled by the recorded clock pulse rate of the same channel, any irregularities such as distortion of the tape, or variations in the positioning of the respective head units of the playback head assembly 111 do not interfere with the accurate distribution of the playback signals into the respective playback shift registers. Thereafter, the reproduced digital signals may be accurately restored by utilizing a high clock pulse rate from a clock pulse source 131 to read out the playback shift registers in series, the reproduced digital signal then being accurately supplied to an output such as indicated at 132 in FIG. 7.

For the sake of a diagrammatic illustration, switches are indicated at 121-123 in FIG. 6 and at 141-143 in FIG. 7 which may be selectively placed in a first mode as indicated in the solid line position for receiving data. The switches 141-143 and 150 and switches 151-153 and 160 may be shifted into a second position for coupling each shift register data input with the respective preceding shift register output. Similarly switches 161-163 and 170 are indicated having first and second positions for coupling with the high rate clock pulse output of source 131 and for coupling with the low rate reproduced clock pulse rate from head units 111.

Figure 8:
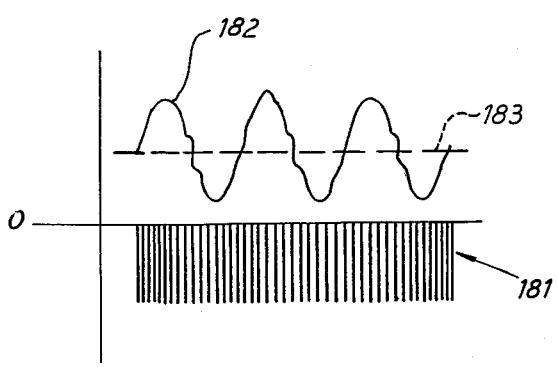
FIG. 8 shows a composite waveform including an analog signal and associated clock pulses which may be recorded and reproduced by the system of FIGS. 6 and 7.

FIG. 8 illustrates an alternative type of multiplex recording arrangement wherein a composite signal from a source 180, FIG. 6, is recorded including successive clock pulses such as indicated at 181 and an analog signal 182 which includes a direct current bias component as indicated at 183. By way of example, each of ten measurement channels with a composite signal as indicated in FIG. 8 may be recorded by the head units 72 on the record tape 70. Then, upon playback, each of the reproduced clock pulses 181 for each channel may be utilized to produce a sampling of the associated analog waveform such as 182. Thus, for example, a set of ten charge transfer device storage units such as 121, FIG. 7, may receive time coincident samples from the respective measurement channels in spite of any physical variations such as distortion of tape record medium 70 or relative misalignment of the playback units such as indicated at 111. A second section of each charge transfer storage unit may be operated with a uniform clock pulse which is timed so that the time coincident measurement values of the respective channels are supplied at the output of the charge transfer storage unit with a uniform time spacing and accurate time relationship in comparison to the original measurement channels.

In FIGS. 6 and 7, where it is desired to multiplex a bipolarity coded signal such as indicated at 191, supplied by an input data source 192, the data source 192 may be synchronized with the clock pulse source 101 as indicated at 193 so as to load the pulses of opposite polarity into the registers 81-90 at the clock pulse rate.

It will be apparent that many modifications and variations may be effected without departing from the scope of the novel concepts and teachings of the present invention.

I claim as my invention:
1. A method of recording and reproducing information where the original signal has a high data rate exceeding the capability of a recording and reproducing system that is subject to mechanical variations in its record tape configuration and in its transducer head units, said method comprising:

pre-processing the signal in a buffer that receives data words at the high rate so as to store the data words in a succession of registers of the buffer, reading out from the registers of the buffer contemporaneously, and recording the data from the respective registers on respective channels of the record tape at a lower rate within the capability of the recording and reproducing system, together with clocking pulses synchronized with the data on each channel, scanning the recorded channels of the record tape to reproduce the data together with the synchronized clocking pulses, reading the data from each channel into a respective register, clocked by the reproduced clocking pulses, and reading out the original information from the registers in series at the high data rate by means of accurate clock pulses at the corresponding high rate to reconstruct the original signal.

* * * * *